Figure 1:
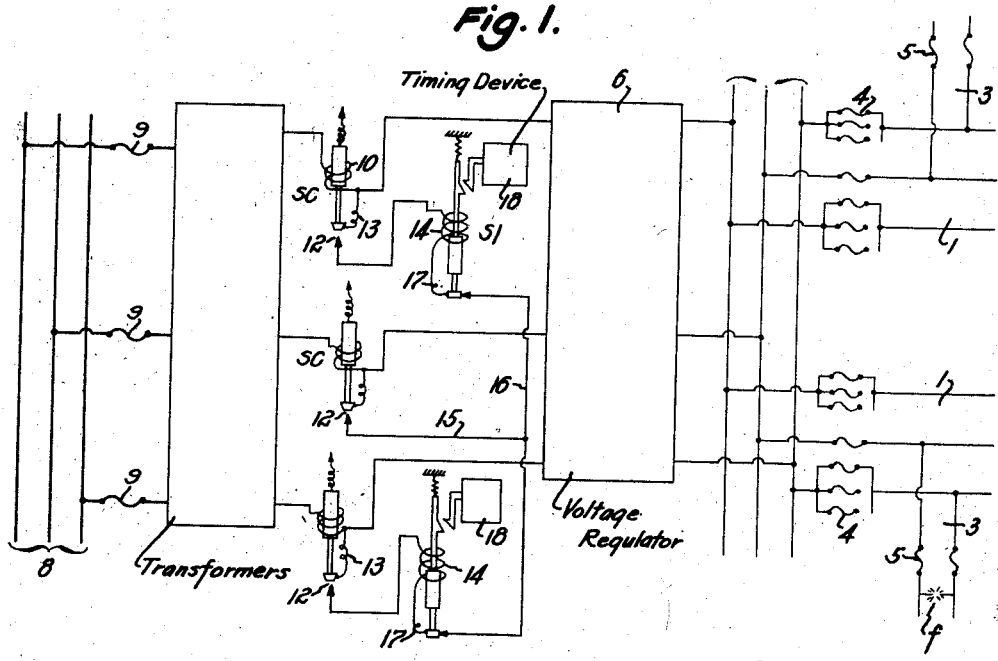

July 7, 1942.                G. A. MATTHEWS                2,288,953
                        ELECTRICAL DISTRIBUTION SYSTEM
                              Filed Aug. 3, 1940

Inventor:
George A. Matthews,
By Potter, Pierce & Scheffler,
Attorneys.

Patented July 7, 1942

2,288,953

UNITED STATES PATENT OFFICE 2,288,953

ELECTRICAL DISTRIBUTION SYSTEM

George A. Matthews, Detroit, Mich., assignor to The Detroit Edison Company, Detroit, Mich., a corporation of New York Application August 3, 1940, Serial No. 351,015

11 Claims. (Cl. 175—294)

This invention relates to electrical distribution systems and particularly to methods of and devices for maintaining optimum operating conditions on overhead feeder circuits.

The present practice of automatically opening a feeder circuit upon the occurrence of a fault results in an appreciable interruption of service, usually for an interval of about 15 seconds, even in the case of purely transient faults. The recent proposals for an "ultra high speed" operation on the first reclosure of circuit breakers will, if generally adopted, reduce the length of these momentary interruptions but any practical mechanical structures for opening and reclosing a feeder circuit will necessarily remove the voltage from the line for an interval substantially longer than that required for the deionization of the original fault path.

According to the present invention, the majority of all faults that may occur on an overhead feeder circuit are removed, without opening the feeder circuit, by connecting a shorting circuit across the line to collapse the voltage at the fault point to zero, the shorting circuit including a switch or fuse that opens the shorting circuit to restore the voltage on the line in about 6 cycles, on a 60 cycles per second basis. The shorting circuit is completed substantially simultaneously with the occurrence of the fault, for example in from ½ cycle to 2 cycles, and the feeder circuit is therefore protected against damage from power arcs that follow a transient fault. The shorting circuits may supplement the usual protective equipment, such as reclosing circuit breakers or fuses, that introduce a number of time-delayed reclosures before definitely opening the feeder circuit or the faulty section of the feeder circuit in the case of a permanent fault.

Methods of and apparatus for protecting feeder circuits from burn off by power arcs resulting from transient faults are described and claimed in my copending application "Methods of and apparatus for protecting power lines," Ser. No. 333,875; filed May 7, 1940. The protective equipment of that application included a normally open "line shorting contactor" connected across the line, an operating coil in series with the line for closing the contactor in about ½ cycle, a spring for opening the shorting contactor upon removal of the line voltage by a circuit breaker, and mechanism for locking the shorting contactor in open position for a period somewhat longer than the operating time, to a lock out, of a reclosing circuit breaker. The line shorting contactors protected the conductors against damage from power arcs and, for transient faults, normal service was restored to the entire system upon the first reclosure of the circuit breaker.

An object of the present invention is to provide protective methods and protective equipment for limiting the service interruption from transient faults to intervals substantially shorter than has been possible in the past, for example to intervals of the order of 6 cycles in the case of a 60 cycle power line. Objects are to provide methods of and devices for protecting electrical distribution systems from faults by short-circuiting the line to reduce the voltage at the fault point to zero for a preselected interval that is sufficient for the removal of the great majority of all faults, and then removing the applied short-circuit to permit the operation of the circuit breakers or other protective equipment in the case of a permanent fault. An object is to provide an electrical distribution system having relatively slow-acting devices for repeatedly opening and closing the circuit in the case of a permanent fault, and a line shorting circuit including in series a normally open switch and a normally closed switch that operate rapidly and in sequence, upon the occurrence of a fault, to complete the shorting circuit to collapse the line voltage to zero and then to open the shorting circuit for a period sufficient for actuation of the slow-acting devices in the case of a permanent fault. An object is to provide a distribution system including circuit breakers and fuses, or repeating fuses, for the protection of the system in the case of permanent faults, and additional protective equipment comprising normally open circuits between feeder wires; the normally open circuits including a line shorting switch that is closed automatically by abnormal current flow in the system, and a fuse or interrupting switch that opens and locks out for a preselected interval upon a closure of the shorting switch. A further object is to provide an electrical distribution system of the type stated in which the fuse or interrupting switch is designed or adjusted to open the shorting circuit in about $\frac{1}{10}$ second, whereby the service interruption in the case of transient faults is restricted to a negligible flicker of the lights on the feeder circuits.

Figure 2:
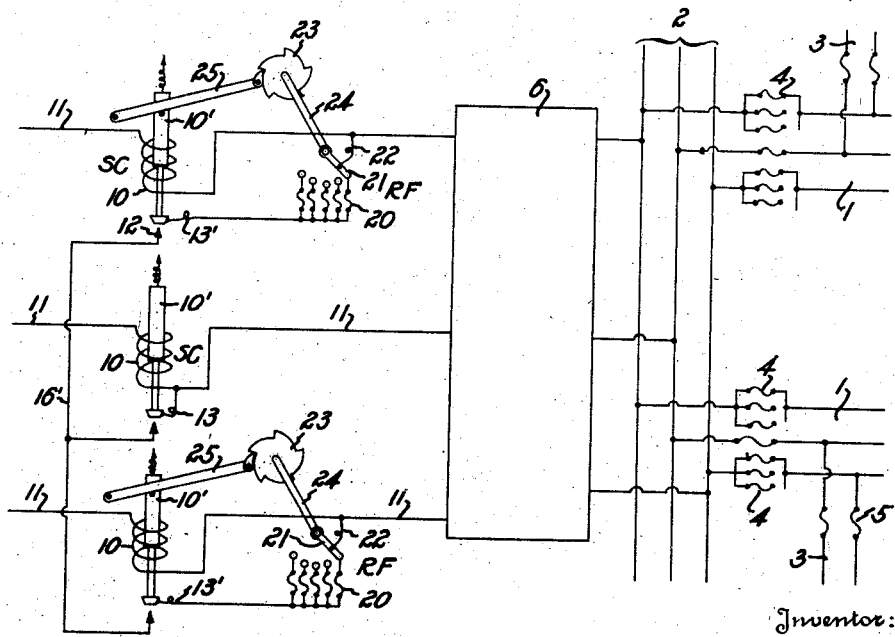

These and other objects and advantages of the invention will be apparent from the following specification when taken with the accompanying drawing in which:

Figs. 1 and 2 are schematic diagrams of different embodiments of the invention.

The invention is particularly suited to stations where the character of the load does not warrant the expense of elaborate switch gear, but may be used to advantage with any known types of reclosing protective equipment as the novel apparatus operates at high speed to clear transient faults before the conventional protective equipment can open the line, and the novel apparatus is then locked out for a predetermined interval which permits the normal functioning of the conventional equipment in the case of a permanent fault.

The network shown in Fig. 1 is typical of stations where a large number of circuits 1 radiate from the bus 2 to supply the branch feeder circuits 3. Where the load does not justify the expense of reclosing circuit breakers, the protective equipment is usually limited to repeating fuses 4 on the main circuits 1 and "single shot" fuses 5 on the branch feeder circuits. Voltage regulating equipment 6 may be provided between the station bus 2 and the low voltage sides of the transformers 7 that are fed from the high voltage line 8. Fuses 9 are usually placed between the transformers and the line 8 to isolate the station in the event of a fault in the station equipment.

A typical station, including the elements so far described, will usually be of such relatively low capacity that the transformers may be directly short circuited, by the high speed apparatus of this invention, without imposing objectionable shocks upon the station equipment. The short-circuiting system includes a normally open "line shorting contactor" SC for each conductor of the station bus 2 and normally closed "bus short interrupter" switches SI. When the neutral point of the three phase distribution system is not grounded, only two bus short interrupter switches are required.

The operating windings 10 of the shorting contactors SC are in series in the supply lines 11 from the transformers 7 to the bus system 2, and the winding may take the form of a few turns of heavy copper wire. The movable member of the normally open contacts 12 of each shorting contactor SC is connected to its associated lead 11 by a flexible jumper 13. The stationry contact members of two of the shorting contactors SC are connected to the operating coils 14 of the interrupter switches SI, and the stationary contact member of the third shorting contactor SC is connected directly by lead 15 to the jumper 16 that joins the stationary contacts of the interrupter switch SI. The operating coil 14 of each of the switches SI is connected to the movable contact of that switch by a flexible jumper 17, and the moving system of each interrupter switch SI is connected to a timing escapement mechanism 18 of any desired type that locks the interrupter switch against reclosure for a predetermined period, for example three minutes, when the moving system is displaced to open the switch by current flow in coil 14.

The line shorting contactors SC are preferably of the general form shown in Fig. 4 of my copending application, but with the time delay mechanism omitted, and operate at high speed to close in about ½ cycle upon abnormal current flow through the coil 10. The interrupter switches SI are preferably similar in structure to the oil reclosing circuit breaker shown in Fig. 8 of my copending application but with the reclosing timing mechanism and the auxiliary control switch omitted. The operating coil 14 of the interrupter switch is designed to open the switch in about 1/10 second, as experience has shown that this short interval is sufficient for the de-ionization of the fault path in substantially all cases of transient faults.

The operation of the protective system in the event of a fault f on one of the feeder circuits is as follows. Heavy current flow due to the fault results in a closure of the contacts of two of the line shorting contactors SC in about ½ cycle, and the voltage at the fault is thus collapsed to zero substantially instantaneously, thereby preventing the blowing of the fuses 5 of the branch circuit and the fuses 4 of the main feeder circuit. The metallic short circuit is removed in about 6 cycles by the opening of interrupter swtich SI, and the voltage is thus restored to the bus system and the branch feeder circuit 3. If the fault was of a transient nature, the opening of the shorting circuit by switch SI restores normal operating voltages on the entire station network, and the shorting contactors SC open at once as the current flow through the operating coils 10 is again at a normal load value. The interrupter switch or switches of the shorting line are locked against reclosure, by the escapement devices 18, and the line shorting circuit therefore remains open for a predetermined period whether the fault was transient or permanent. In the case of a permanent fault, the shorting contactors SC will be held in closed position by heavy current flow to the fault point, and the faulty feeder 3 will be isolated by the blowing of the fuses 5. The clearing of the fault in this manner reduces the current flow through operating coils 10 to normal values, the shorting contactors open at once, and the interrupter switch SI recloses after the time delay period, thus restoring the protective equipment to normal condition for another cycle of operations.

The embodiment of the invention that is shown diagrammatically in Fig. 2 is generally similar to the Fig. 1 system in that shorting contactors SC are provided for each conductor 11 of the distribution system, the line shorting circuits are automatically opened after a preselected short interval, and the shorting circuits are then held open for a period sufficient to isolate a branch on which there is a permanent fault. Each interrupting device is a repeating fuse assembly RF comprising a series of fuses 20 that each have a terminal connected through the jumper 13' to the movable member of the contacts 12 of the associated shorting contactor, and a terminal connected to a contact point of a selector switch, the contact arm 21 of the switch being connected to conductor 11, at the load side of the shorting contactor, by a lead 22. The moving contact of one shorting contactor is connected directly to its operating winding by a jumper 13 and the stationary contacts of all shorting contactors SC are connected by a lead 16'. With these connections, the energization of any two shorting contactors by a fault current will complete a shorting circuit between the line conductors affected by the fault.

The contact arm 21 of a fuse selector switch is advanced automatically by the return movement of the core 10' of the associated shorting contactor SC, and the advance of the selector switch to connect a new fuse into the shorting circuit therefore does not take place so long as there is an abnormal current flow in the operating coil 10 of the shorting contactor. The mechanism for coupling the contact arm of a selector switch to the associated core 10' may be of any desired form such as, for example, the illustrated pawl and ratchet wheel mechanism 23; the ratchet wheel operating the contact arm 21 through a shaft 24, and the pawl being mounted on a lever 25 that extends into the path of the core 10'.

A fault on a feeder circuit results in abnormal current flow in the operating coils 10 of two shorting contactors, and the contacts 12 of those contactors close in about ½ cycle to complete a shorting circuit through the associated repeating fuse assemblies RF. The fuses 20 blow at the end of an interval of the order of 6 cycles, thus opening the shorting circuit. In the case of a transient fault that cleared in the 6 cycle interval, normal service is restored on the entire system by the removal of the short circuit, and the normal load current through the operating coils 10 is not sufficient to hold the shorting contactors in closed position. The cores 10' of the shorting contactors are lifted by springs, not shown, and operate the pawl and ratchet mechanism 23 to advance the contact arms 21 one step to connect another set of fuses 20 into the shorting circuit. If the fault is still on the line when the shorting circuit is opened by the blowing of one set of fuses 20, the fault current flows through the operating windings 10 of the shorting contactors and holds the contactors in closed position, thus preventing movement of cores 10'. The contact arms 21 of the fuse selector switches do not advance to insert new fuses 20 in the shorting circuit, and a heavy current flows through the fault until the branch feeder is isolated by the blowing of its fuses 5. The repeating fuses 4 of the main feeder 1 may also blow, but service is quickly restored upon all of the network except the isolated branch feeder circuit 3 by the repeating fuse 4. The load current drops to normal values upon the isolation of the defective feeder circuit, and the shorting contactors SC then open and advance the contact arms 21 of the associated repeating fuses RF, thus resetting the high speed protective equipment for another cycle of operations.

It is to be noted that the coupling of the selector switch to the moving system of the associated shorting contactor eliminates the timing mechanism that is present in the Fig. 1 system to prevent repeated reclosures of the shorting circuits in the case of a permanent fault. The repeating fuse type of interrupter for the shorting circuits is simpler and less expensive than the magnetic switch type of interrupter.

The high operating speed of the equipment in the line shorting circuits is a characteristic and important feature of the invention as it reduces the interruption of service to the negligible interval of about $\frac{1}{10}$ second in the case of transient faults but it is to be noted that other and slower acting protective devices are required since all faults are not of a transient nature. Conventional protective equipment, such as the illustrated sectionalizing fuses or circuit breakers must be included in the network, and the shorting circuits must "lock out" for a predetermined interval or until the faulty section is isolated.

The operating time of the equipment in the shorting circuits may be increased beyond about 6 cycles or reduced below that value, and it is therefore to be understood that the invention is not restricted to any particular operating time. An operating time of from 6 to 10 cycles is preferred, at least on typical distribution circuits with which I am familiar, as it affords ample time for the de-ionization of the original fault path in the case of transient faults, and is so short that the interruption of service is reduced to a negligible flicker of the lights in the case of transient faults.

I claim:

1. The method of protecting an electrical distribution system against faults which comprises short circuiting the system substantially instantaneously to reduce the voltage at the fault point to zero within not more than two cycles after fault inception, removing the short circuit after an interval equal to that required for deionization of the original fault path, and thereafter isolating the faulty section of the system in the case of a permanent fault.

2. The method of reducing the interruption of service by transient faults between conductors of an electrical distribution system which comprises short circuiting the conductors in not more than two cycles after fault inception, thereby to reduce the voltage at the fault point to zero, removing the short circuit in a time interval of the order of $\frac{1}{10}$ second after it is established, whereby transient faults are suppressed without opening the circuit of said conductors, and thereafter opening the circuit of said conductors in the case of a permanent fault.

3. In an electrical distribution system, the combination with apparatus for initially opening the system after a short predetermined time interval in the case of a fault, of means responsive to a fault for quickly imposing a short circuit upon the system, thereby to collapse the voltage on the system to zero, and voltage-restoring means to remove the short circuit from the system prior to the expiration of said predetermined time interval required for operation of said apparatus initially to open said system, whereby said apparatus is inoperative to open said system in the event of a transient fault that terminates prior to the removal of the short circuit by said voltage-restoring means.

4. In an electrical distribution system, the combination with apparatus for opening the system after a predetermined time interval in the case of a permanent fault, of means for short circuiting the system in not more than $\frac{1}{30}$ second after fault inception, means for removing the short circuit in an interval of the order of $\frac{1}{10}$ second after it is established by said first means, and means to prevent a re-establishment of the short circuit for a period after its removal.

5. In an electrical distribution system, the combination with apparatus for opening the system after a predetermined time interval in the case of a permanent fault, of means for short circuiting the system in not more than $\frac{1}{30}$ second after fault inception, means for removing the short circuit in an interval of the order of $\frac{1}{10}$ second after it is established by said first means, and means to prevent a re-establishment of the short circuit until the expiration of said predetermined time interval within which said apparatus will open the system in the case of a permanent fault.

6. In an electrical distribution system, a current source, a plurality of feeder circuits, conductors extending from said source to said circuits, and means responsive to a fault on a feeder circuit for completing a shorting circuit between said conductors; said means comprising in series between said conductors a normally open switch and a normally closed circuit interrupter, means responsive to abnormal current flow in said conductors to close said normally open switch, said circuit interrupter being energized by current flow through said shorting circuit to open the same, and means for locking said circuit interrupter in open circuit position upon an energization thereof.

7. In an electrical distribution system, the combination with conductors feeding a plurality of branch circuits, and relatively slow acting means for opening a circuit in event of a permanent fault on that circuit, of normally open shorting contactor switches having operating windings in series in said conductors, normally closed circuit interrupters in series with the contacts of said shorting contactor switches for completing shorting circuits between said conductors upon closure of said normally open switches, and means responsive to short circuit current flow through said normally open switches for opening said circuit interrupters prior to the opening of a circuit by said slow acting means.

8. An electrical system as claimed in claim 7, wherein said circuit interrupters include means to delay the reclosure of said shorting circuits upon an opening thereof by said circuit interrupters.

9. An electrical system as claimed in claim 7, wherein said circuit interrupters comprise switches having operating windings in series with the normally open shorting contactor switches.

10. An electrical system as claimed in claim 7, wherein said circuit interrupters comprise repeating fuses and means responsive to an opening of the associated shorting contactor switch for connecting a new fuse in circuit through the repeating fuse.

11. In a distribution system, the combination with a three-phase source of current, a load circuit, three line conductors connecting said current source to said load circuit, and protective devices responsive to a permanent fault on said load circuit for opening the same, of means to protect said load circuit against damage from transient faults; said means comprising three normally open switches having operating windings in series in the respective line conductors, a pair of normally closed circuit interrupters, circuit elements connecting said circuit interrupters in a shorting circuit extending between two of said conductors, said shorting circuit including in series the circuit interrupters and the contacts of the normally open switches whose operating windings are in series with the said two conductors, and circuit elements connecting one contact of the third normally open switch to the third conductor and the other contact to said shorting circuit at a point between said circuit interrupters.

GEORGE A. MATTHEWS.